US011321920B2

(12) United States Patent
Iwase

(10) Patent No.: US 11,321,920 B2
(45) Date of Patent: May 3, 2022

(54) DISPLAY DEVICE, DISPLAY METHOD, PROGRAM, AND NON-TEMPORARY COMPUTER-READABLE INFORMATION STORAGE MEDIUM

(71) Applicant: Rakuten Group, Inc., Tokyo (JP)

(72) Inventor: Hiroaki Iwase, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/648,019

(22) PCT Filed: Aug. 1, 2018

(86) PCT No.: PCT/JP2018/028874
§ 371 (c)(1),
(2) Date: Mar. 17, 2020

(87) PCT Pub. No.: WO2020/026380
PCT Pub. Date: Feb. 6, 2020

(65) Prior Publication Data
US 2020/0279437 A1 Sep. 3, 2020

(51) Int. Cl.
*G06F 3/01* (2006.01)
*G06T 19/00* (2011.01)

(52) U.S. Cl.
CPC .......... *G06T 19/003* (2013.01); *G06F 3/011* (2013.01)

(58) Field of Classification Search
None
See application file for complete search history.

(56) References Cited

U.S. PATENT DOCUMENTS

| 9,268,136 | B1 | 2/2016 | Starner et al. | |
|---|---|---|---|---|
| 2016/0260251 | A1* | 9/2016 | Stafford | G02B 27/0101 |
| 2017/0083084 | A1 | 3/2017 | Tatsuta et al. | |
| 2017/0357333 | A1 | 12/2017 | Balan et al. | |
| 2018/0024623 | A1* | 1/2018 | Faaborg | G06F 3/04815 |
| | | | | 345/156 |
| 2019/0130622 | A1* | 5/2019 | Hoover | G02B 27/017 |

FOREIGN PATENT DOCUMENTS

JP   2018-072992 A   5/2018

OTHER PUBLICATIONS

International Search Report for PCT/JP2018/028874 dated Sep. 11, 2018 (PCT/ISA/210).

* cited by examiner

*Primary Examiner* — Carl Adams
(74) *Attorney, Agent, or Firm* — Sughrue Mion, PLLC

(57) ABSTRACT

A state information storage (121) stores an observation position, an observation direction, and a base direction in a virtual space. Upon acceptance of an instruction input given to an external controller and indicating a moving direction, an observation position updater (112) updates the observation position so that the observation position moves in the moving direction indicated by the instruction input relative to the base direction. An observation direction updater (114) updates the observation direction in accordance with a change in orientation of a display apparatus (100) as detected by a detector (113). An obtainer (115) obtains a relative position between the controller and the display apparatus (100). A base direction updater (116) updates the base direction on the basis of the observation direction and of the obtained relative position.

5 Claims, 12 Drawing Sheets

DISPLAY DEVICE, DISPLAY METHOD, PROGRAM, AND NON-TEMPORARY COMPUTER-READABLE INFORMATION STORAGE MEDIUM

CROSS REFERENCE TO RELATED APPLICATIONS

This application is a National Stage of International Application No. PCT/JP2018/028874 filed Aug. 1, 2018.

TECHNICAL FIELD

The present disclosure relates to a display apparatus, a display method, a program, and a non-transitory computer-readable information recording medium.

BACKGROUND ART

For a virtual reality system that provides the user with a virtual space through a head-mounted display, methods for manipulating a character (avatar), which is the user's alter ego, are made available, including, for example, detecting the user's eye direction and moving the avatar to the position at which the user is recognized as gazing on the basis of the detected eye direction (see Patent Literature 1, for example).

CITATION LIST

Patent Literature

PTL 1: Unexamined Japanese Patent Application Kokai Publication No. 2018-72992

SUMMARY OF INVENTION

Technical Problem

Meanwhile, the user may sometimes want to move the avatar in a direction different from the user's eye direction, such as, for example, when the avatar is walking along a wall while watching paintings on the wall in a virtual space that reproduces an art gallery. A typical method for controlling movement of a character in a virtual space may be using a terminal device such as a controller operated by the user to give an instruction about a particular moving direction for the character. However, suppose that, for example, the user's body is oriented frontward except the user's head facing sideways, and that the user intuitively gives via a terminal device an instruction about the moving direction relative to the orientation of the user's torso. In this case, when the orientation of the head-mounted display is only detectable, the instruction about the moving direction is regarded as having been given relative to the avatar's observation direction that is identified on the basis of the orientation of the head-mounted display. As a result, the avatar may be moved in a direction different from the moving direction that the user has intuitively specified.

The present disclosure is intended to solve the aforementioned problems, and an objective of the present disclosure is to provide a display apparatus, a display method, a program, and a non-transitory computer-readable information recording medium for enabling the observation position in a virtual space to be moved in accordance with an intuitive instruction input given by a user.

Solution to Problem

A display apparatus according to a first aspect of the present disclosure is a display apparatus including:

an accepter that accepts an instruction input indicating a moving direction, the instruction input being given to an external controller;

a detector that detects a change in orientation of the display apparatus;

a storage that stores an observation position, an observation direction, and a base direction in a virtual space;

an observation position updater that updates, upon acceptance of the instruction input, the observation position so that the observation position moves in the moving direction indicated by the instruction input relative to the base direction;

an observation direction updater that updates the observation direction in accordance with the detected change in orientation of the display apparatus;

an obtainer that obtains a relative position between the controller and the display apparatus; and a base direction updater that updates the base direction, based on the observation direction and on the obtained relative position.

In the display apparatus according to the aforementioned aspect, the obtainer may obtain the relative position through detection performed by a sensor which is included in at least one of the controller or the display apparatus to detect another of the at least one of the controller or the display.

In the display apparatus according to the aforementioned aspect, the obtainer may obtain the relative position estimated from a difference between a first orientation detected by a first attitude sensor included in the controller and a second orientation detected by a second attitude sensor included in the display apparatus.

In the display apparatus according to the aforementioned aspect, the display apparatus may further include a light emitter that shines light in a predetermined pattern, and the obtainer may obtain from the controller the relative position that is identified by the controller based on a position of the light emitter in an image taken by a camera included in the controller and on the pattern.

A display method according to a second aspect of the present disclosure is a display method executed by a display apparatus that includes a storage storing an observation position, an observation direction, and a base direction in a virtual space, the display method including:

an accepting step of accepting an instruction input indicating a moving direction, the instruction input being given to an external controller;

a detecting step of detecting a change in orientation of the display apparatus;

an observation position updating step of updating, upon acceptance of the instruction input, the observation position so that the observation position moves in the moving direction indicated by the instruction input relative to the base direction;

an observation direction updating step of updating the observation direction in accordance with the detected change in orientation of the display apparatus;

an obtaining step of obtaining a relative position between the controller and the display apparatus; and a base direction updating step of updating the base direction, based on the observation direction and on the obtained relative position.

A program according to a third aspect of the present disclosure causes a computer that includes a storage storing an observation position, an observation direction, and a base direction in a virtual space to function as:

an accepter that accepts an instruction input indicating a moving direction, the instruction input being given to an external controller;

a detector that detects a change in orientation of a display apparatus;

an observation position updater that updates, upon acceptance of the instruction input, the observation position so that the observation position moves in the moving direction indicated by the instruction input relative to the base direction;

an observation direction updater that updates the observation direction in accordance with the detected change in orientation of the display apparatus;

an obtainer that obtains a relative position between the controller and the display apparatus; and a base direction updater that updates the base direction, based on the observation direction and on the obtained relative position.

A non-transitory computer-readable information recording medium according to a fourth aspect of the present disclosure causes a computer that includes a storage storing an observation position, an observation direction, and a base direction in a virtual space to function as:

an accepter that accepts an instruction input indicating a moving direction, the instruction input being given to an external controller;

a detector that detects a change in orientation of a display apparatus;

an observation position updater that updates, upon acceptance of the instruction input, the observation position so that the observation position moves in the moving direction indicated by the instruction input relative to the base direction;

an observation direction updater that updates the observation direction in accordance with the detected change in orientation of the display apparatus;

an obtainer that obtains a relative position between the controller and the display apparatus; and a base direction updater that updates the base direction, based on the observation direction and on the obtained relative position.

Note that the aforementioned information recording medium can be distributed or sold independently of computers. The non-transitory information recording medium as used herein refers to a tangible information recording medium. Examples of the non-transitory information recording medium include a compact disk, a flexible disk, a hard disk, a magnetic disk, a digital video disk, a magnetic tape, and a semiconductor memory. A transitory information recording medium refers to a transmission medium (a propagated signal) itself. Examples of the transitory recording medium include an electronic signal, an optical signal, and an electromagnetic wave. A temporary storage area refers to an area for temporarily storing data and programs, such as a random access memory (RAM) and other volatile memories.

Advantageous Effects of Invention

The present disclosure enables the observation position in a virtual space to be moved in accordance with an intuitive instruction input given by a user.

DESCRIPTION OF EMBODIMENTS

Figure 1:
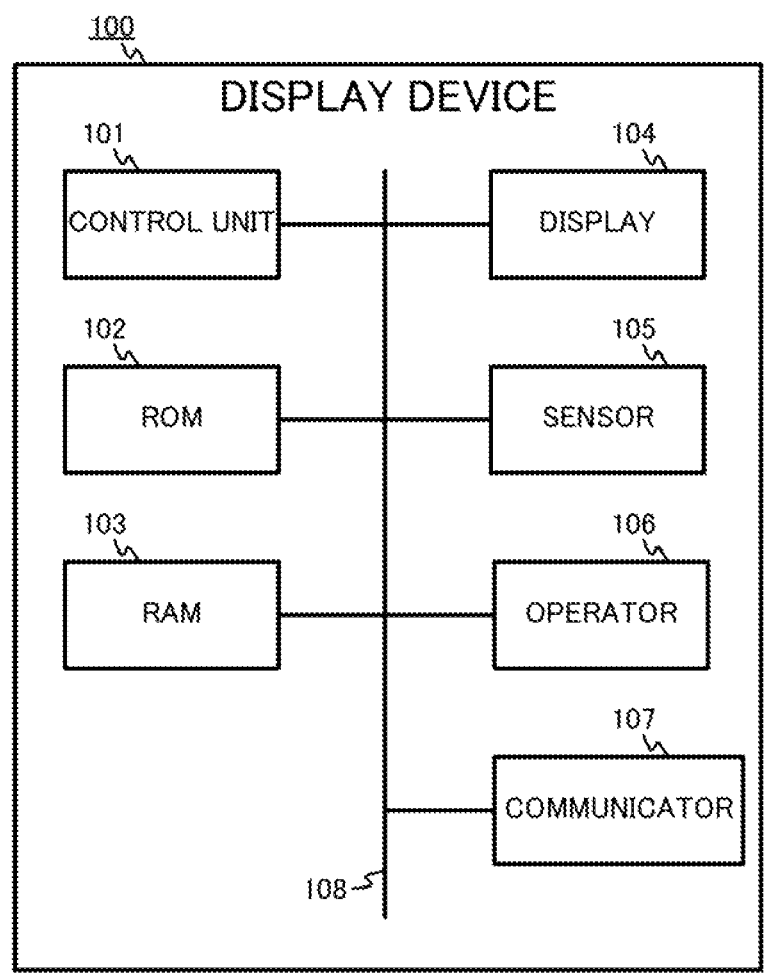
FIG. 1 is a schematic block diagram illustrating a hardware configuration of a display apparatus according to an embodiment.

Embodiments of the present disclosure will now be described. The embodiments are presented for explanatory purposes only and do not limit the scope of the present disclosure. Accordingly, persons skilled in the art can adopt embodiments in which any or all of the elements in the following embodiments are replaced with equivalents thereof, and such adopted embodiments are included in the scope of the present disclosure. For explaining embodiments of the present disclosure referring to the drawings, identical reference symbols are given to identical or equivalent parts throughout the drawings.

FIG. 1 is a schematic block diagram illustrating a hardware configuration of a display apparatus 100 according to the present embodiment. The display apparatus 100 includes, for example, a head-mounted display that has various types of sensors and a control device. The head-mounted display may be built by mounting a smart phone, a tablet computer, a phablet, or the like onto an attachment. In this case, the display apparatus 100 is implemented by executing a program causing a computer such as a smart phone to function as the aforementioned components on the computer such as a smart phone. As illustrated in FIG. 1, the display apparatus 100 includes a control unit 101, a read-only memory (ROM) 102, a RAM 103, a display 104, a sensor 105, an operator 106, and a communicator 107, which are connected by a bus 108.

The control unit 101, which includes, for example, a central processing unit (CPU), controls the display apparatus 100 as a whole.

The ROM 102 is a non-volatile memory storing programs and various types of data needed for the control unit 101 to control the display apparatus 100 as a whole.

The RAM 103 is a volatile memory for temporarily storing information generated by the control unit 101 and data needed for generating the information.

The display 104, which includes a liquid crystal display (LCD), a backlight, and so on, is under control of the control unit 101 to show, for example, an image output by the control unit 101.

The sensor 105, which may include an attitude sensor and an acceleration sensor, detects the orientation of the display apparatus 100. The sensor 105 outputs a signal indicating the detected orientation of the display apparatus 100 to the control unit 101.

The operator 106 includes an input device such as a button, a keyboard, and a touch panel. The operator 106 accepts operations input by the user of the display apparatus 100 and outputs signals corresponding to the accepted input operations to the control unit 101.

The communicator 107 includes a communication interface for communicating with a controller 220, which will be described later. The communicator 107 communicates with the controller 220 under a wireless communication standard such as Bluetooth®.

Figure 2:
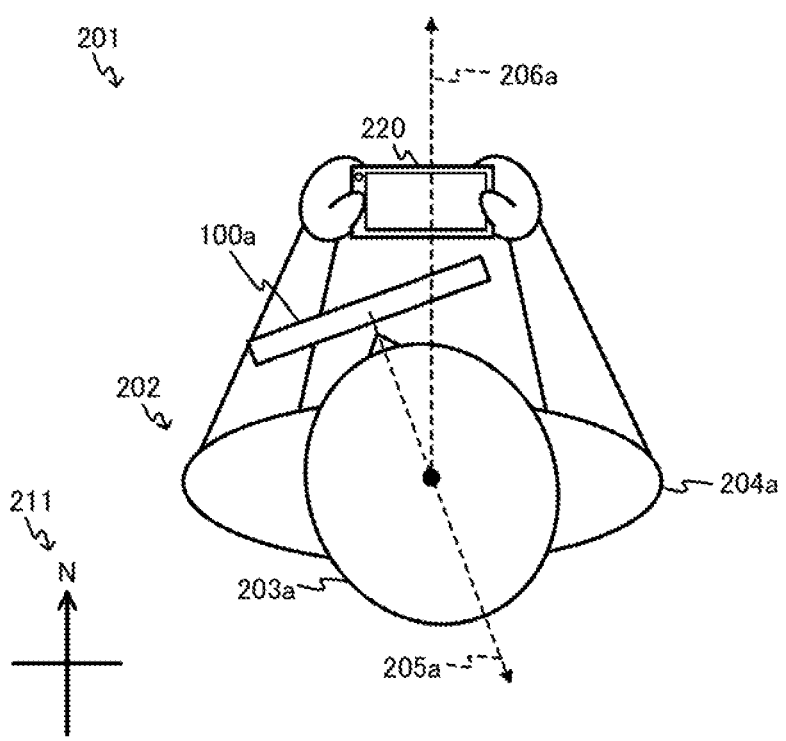
FIG. 2 is a top view of the display apparatus and a user in a real space before the orientations of the display apparatus and the user are changed.
Figure 3A:
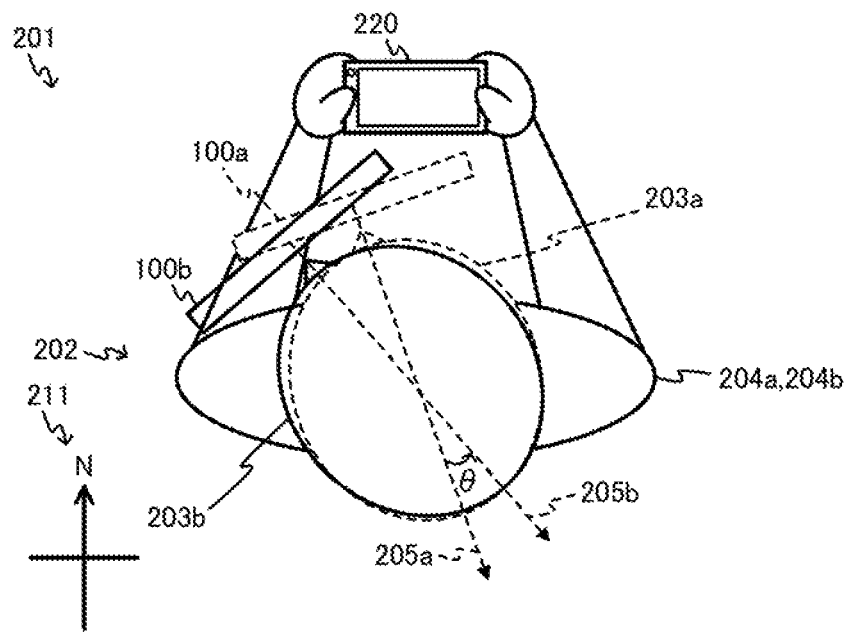
FIG. 3A is a top view of the user and the display apparatus after their orientations are changed in the real space by the user rotating the orientation of the head only.
Figure 3B:
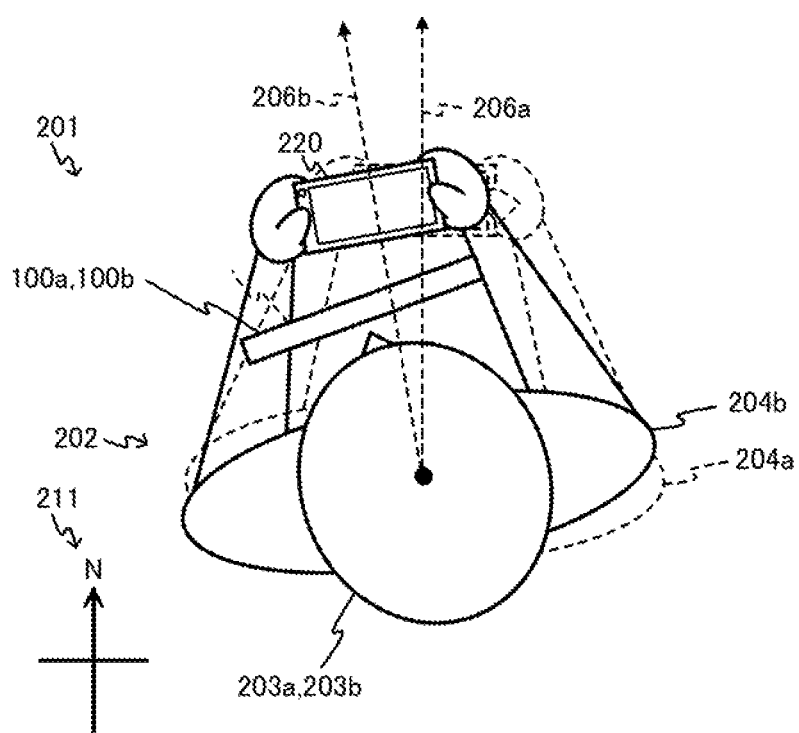
FIG. 3B is a top view of the user and the display apparatus after their orientations are changed in the real space by the user rotating the orientation of the torso only.
Figure 4:
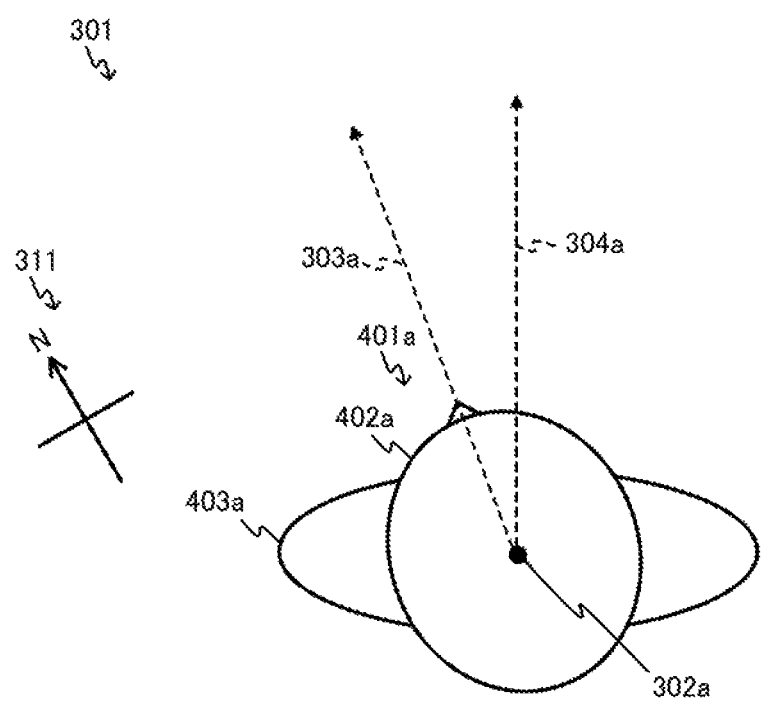
FIG. 4 is a top view of a virtual space before the orientations of the display apparatus and the user are changed in the real space.
Figure 5A:
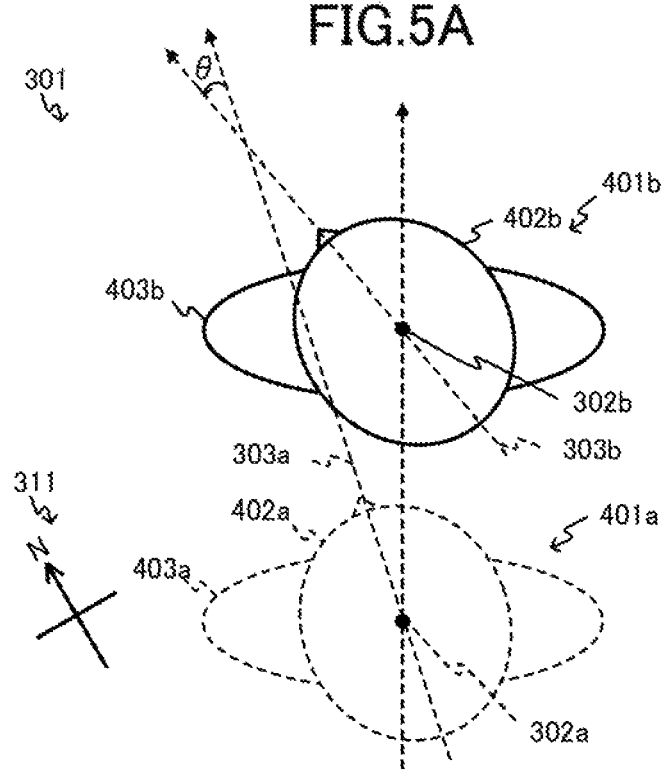
FIG. 5A is a top view of the virtual space after the orientations of the display apparatus and the user are changed in the real space by the user rotating the orientation of the head only.
Figure 5B:
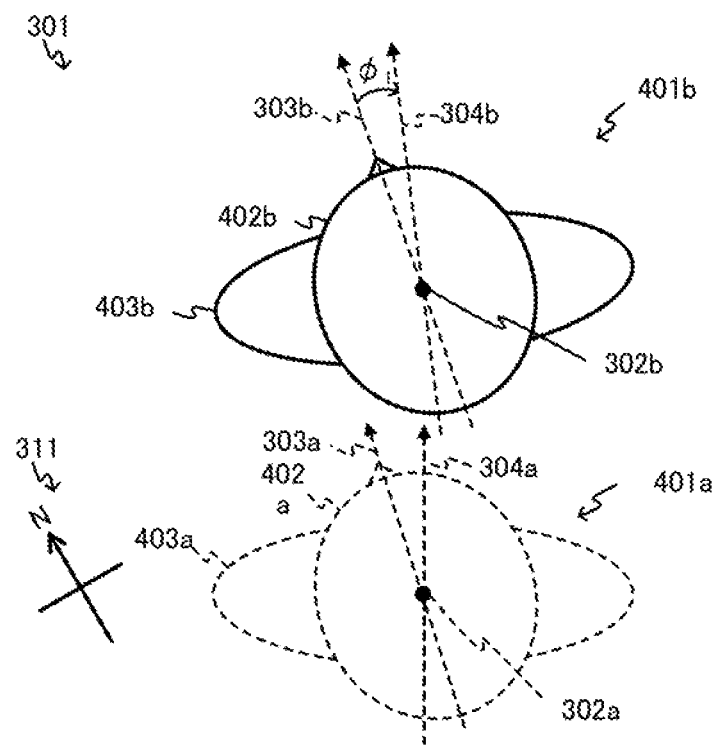
FIG. 5B is a top view of the virtual space after the orientations of the display apparatus and the user are changed in the real space by the user rotating the orientation of the torso only.

The following describes a positional relationship between the display apparatus 100 and the user 202 in a real space 201 and in a virtual space 301 shown on the display apparatus 100 according to the present embodiment. FIG. 2 is a top view of the real space 201 (at time $t_a$) before the orientations and positions of the display apparatus 100 and the user 202 are changed. FIG. 4 is a top view of the virtual space 301 (at time $t_a$) before the orientations and positions of the display apparatus 100 and the user 202 are changed in the real space 201. FIGS. 3A and 3B are top views of the real space 201 (at time $t_b$) after the orientations and positions of the display apparatus 100 and the user 202 are changed. FIG. 3A shows the real space 201 after the orientation of the display apparatus 100 is changed by the user 202 rotating the orientation of the head 203 only. FIG. 3B shows the real space 201 after the user 202 changes the orientation of the torso 204 only. FIGS. 5A and 5B are top views of the virtual space 301 (at time $t_b$) after the orientations and positions of the display apparatus 100 and the user 202 are changed in the real space 201. FIG. 5A shows the virtual space 301 after the user 202 changes the orientation of the display apparatus 100 by rotating the orientation of the head 203 only. FIG. 5B shows the virtual space 301 after the user 202 changes the orientation of the torso 204 only. The description below is given with reference to these figures. Lower-case alphabetic letters are added to these figures as appropriate for expressing an elapse of time from time $t_a$ to time $t_b$. These lower-case alphabetic letters are omitted in the following description if appropriate.

As illustrated in FIGS. 2, 3A, and 3B, the user 202 wears the display apparatus 100 placed in front of the eyes of the user 202 in the real space 201. When the user 202 wears the display apparatus 100, the display direction 205 of the display apparatus 100 is opposite to the observation position 302 of an avatar 401, which will be described later, in the virtual space 301 as illustrated in FIGS. 4A, 4B, 5A, and 5B.

In the real space 201, the user 202 is holding the controller 220. The controller 220 is a terminal device for manipulating the avatar 401, which is placed in the virtual space 301 and displayed on the display device 100. The avatar 401 is an object created by using computer graphics to represent an alter ego of the user 202 in the virtual space 301. As illustrated in FIGS. 4, 5A, and 5B, in the present embodiment, the avatar 401 is human-shaped, and the position of the head 402 of the avatar 401 corresponds to an observation position 302, the eye direction of the head 402 corresponds to an observation direction 303, and the frontward direction of the torso 403 corresponds to a base direction 304. The controller 220 can wirelessly communicate with the display device 100 using Bluetooth®, for example. For instance, the user 202 inputs an instruction input indicating a moving direction of the avatar 401 to the controller 220 by operating a key or a touch panel included in the controller 220. The controller 220 then transmits the accepted instruction input to the display device 100. As described later, the display device 100 updates the observation position 303, the observation direction 303, and the base direction 304 of the avatar 401 in the virtual space 301, on the basis of the instruction input received from the controller 220 and of the orientation of the display device 100.

Note that azimuth directions 211 in the real space 201 may or may not match azimuth directions 311 in the virtual space 301. In the present embodiment, the azimuth directions differ between the real space and the virtual space.

Figure 6:
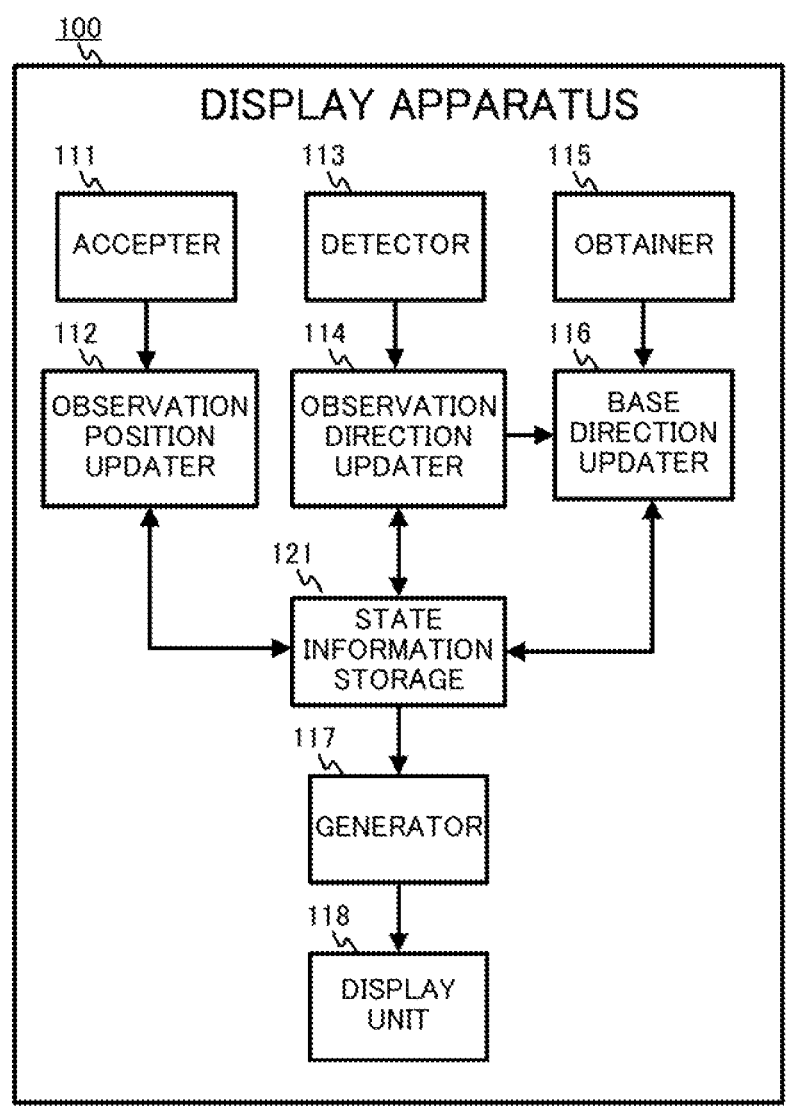
FIG. 6 is a schematic block diagram illustrating a functional configuration of the display apparatus according to an embodiment.

FIG. 6 is a schematic block diagram illustrating a functional configuration of the display apparatus 100 according to the embodiment of the present disclosure. As shown in FIG. 6, the display apparatus 100 includes an accepter 111, an observation position updater 112, a detector 113, an observation direction updater 114, an obtainer 115, a base direction updater 116, a generator 117, a display unit 118, and a state information storage 121.

The state information storage 121 stores the observation position 302, the observation direction 303, and the base direction 304 of the avatar 401 in the virtual space 301. As described later, the observation position 302, the observation direction 303, and the base direction 304 are updated by the observation position updater 112, the observation direction updater 114, and the base direction updater 116, respectively. The state information storage 121 is implemented by the RAM 103.

The accepter 111 accepts an instruction input that is given to the controller 220 to indicate a moving direction. For example, the accepter 111 receives, from the controller 220 via the communicator 107, a signal indicating an instruction input accepted by the controller 220. In the present embodiment, the control unit 101 and the communicator 107 collaborate with each other to function as the accepter 111.

When the accepter 111 accepts an instruction input, the observation position updater 112 updates the observation position 302 so that the observation position moves in the direction indicated by the input instruction relative to the base direction 304. As an example, suppose that the accepter 111 has received from the controller 220 an instruction input to move forward, that is, to move in the frontward direction 206a of the torso 204a from time $t_a$ to time $t_b$, as illustrated in FIG. 2. Then, the observation position updater 112 updates, as illustrated in FIGS. 5A and 5B, the current observation position 302a stored in the state information storage 121 to the observation position 302b, to which the observation position 302a will be moved forward along the base direction 304a at velocity V relative to the current base direction 304a stored in the status information storage 121.

In other words, the observation position updater 112 updates to the observation position 302b, which is frontward away from the observation position 302a by a distance $V \times (t_b - t_a)$.

The time interval between time $t_a$ and time $t_b$ may be determined according to an intended application. For example, the refresh interval (such as a vertical synchronization period) for the display 104 in the display apparatus 100 may be used as the time interval. Time $t_b$ in one repeating unit is taken as time $t_a$ in the next repeating unit because the process is repeated as described later.

In the present embodiment, the control unit 101 functions as the observation position updater 112.

The detector 113 detects a change in orientation of the display apparatus 100 in the real space 201. For example, from measurements provided by the sensor 105, the detector 113 detects a change in the display direction 205 of the display apparatus 100 relative to the reference axis in the real space 201. As the reference axis in the real space 201, either the direction of gravitational force in the real space 201 or the vertical direction of the display 104 in the display apparatus 100 is typically adopted.

In the present embodiment, the control unit 101 and the sensor 105 collaborate with each other to function as the detector 113.

The observation direction updater 114 updates the observation direction 303 in the virtual space 301, in accordance with the orientation of the display apparatus 100 as detected by the detector 113. For example, the observation direction updater 114 begins with obtaining an amount of rotation θ around the reference axis in the real space 201, with regard to the change in the display direction 205 of the display apparatus 100 as detected by the detector 113 from time $t_a$ to time $t_b$. Specifically, FIG. 2 shows that the display apparatus 100a faces the user 202 in the display direction 205a before the user 202 changes the orientation of the head 203a. FIG. 3A shows that the display apparatus 100b faces the user 202 in the display direction 205b after the user 202 changes the orientation of the head 203b. The angle formed between the display direction 205a and the display direction 205b is the amount of rotation θ around the reference axis. The amount of rotation θ is equivalent to the so-called yaw angle.

Then, as illustrated in FIG. 5A, the observation direction updater 114 updates the observation direction 303a to the observation direction 303b by rotating the observation direction 303a, which is stored in the state information storage 121, around the reference axis of the observation position 302a in the virtual space 301 by the amount of rotation θ.

In the present embodiment, the control unit 101 functions as the observation direction updater 114.

The obtainer 115 obtains from the controller 220 the relative position between the controller 220 and the display apparatus 100.

Figure 7:
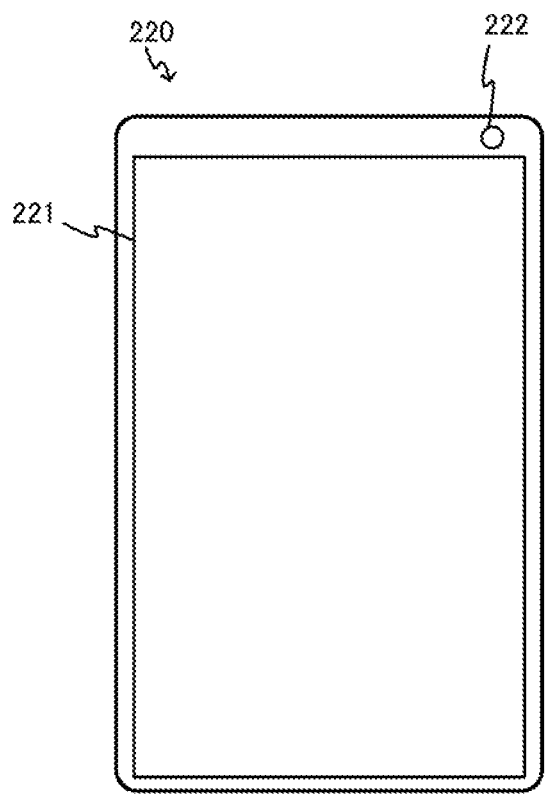
FIG. 7 is a front view of a controller according to an embodiment.

The following describes an example method for obtaining the relative position in the present embodiment. FIG. 7 is a front view of the controller 220 according to the present embodiment. The controller 220 according to the present embodiment is a smart phone including a touch panel 221 and a camera 222, both disposed on the front face as illustrated in FIG. 7. The touch panel 221 accepts an instruction input given by the user 202 indicating a moving direction. For example, when the user 202 slides a finger of the user 202 on the touch panel 221, the touch panel 221 detects the sliding direction and recognizes that an instruction input indicating the moving direction corresponding to the detected sliding direction has been accepted. The camera 222, which is an example of a sensor for detecting the display apparatus 100, takes images of a scene in front of the camera 222. Specifically, the camera 222 takes images of a scene including the display apparatus 100, with the camera 222 held by the user 202 as illustrated in FIGS. 2 and 3. On the basis of the position of the display apparatus appearing in an image taken by the camera 222, the controller 220 identifies the relative position between the controller 220 and the display apparatus 100.

Figure 8:
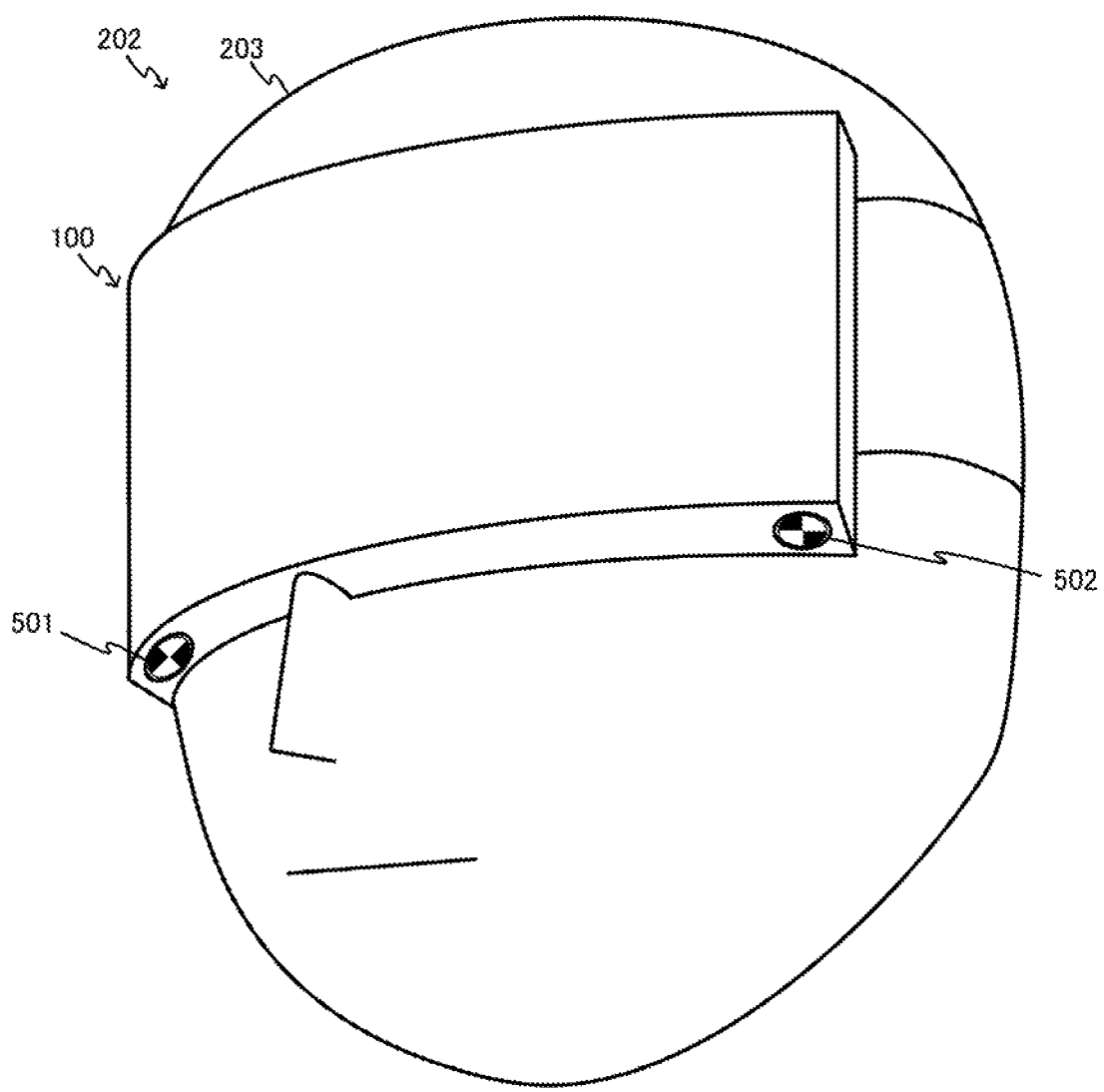
FIG. 8 is an external view of the display apparatus worn by the user according to an embodiment.
Figure 9A:
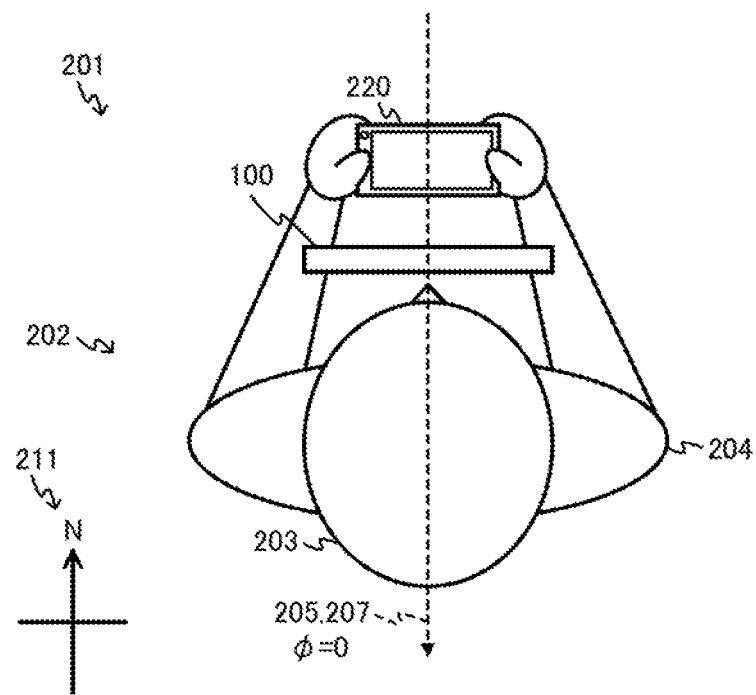
FIG. 9A is a top view of the display apparatus and the controller when a relative position is 0.
Figure 9B:
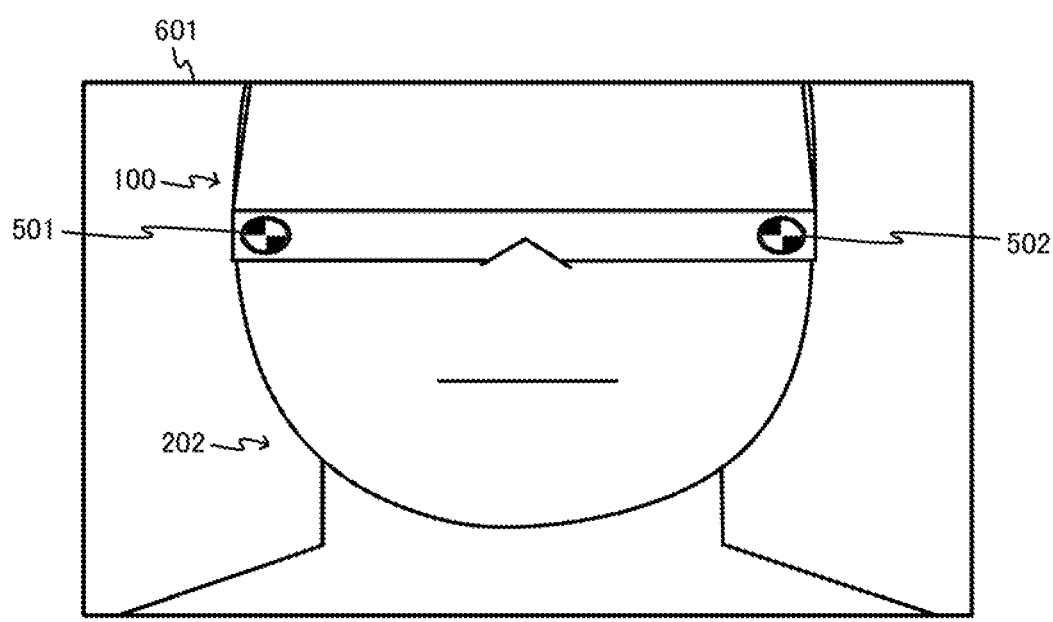
FIG. 9B is an image taken by the controller in the state illustrated in FIG. 9A.

The following describes in detail an example method for identifying the relative position based on the position of the display apparatus in an image taken by the camera 222. FIG. 8 is an external view of the display apparatus 100 worn by the user according to the present embodiment. As shown in FIG. 8, the display apparatus 100 includes markers 501 and 502 disposed at the right and left ends of the bottom. The controller 220 recognizes the markers 501 and 502 in an image taken by the camera 220 to identify the relative position based on the positions of the markers 501 and 502 in the image. In the following description, it is assumed that the controller 220 is always positioned in front of the user 202, and the relative position φ to be identified is defined as an angle formed between the display direction 205 and a reference direction 207, which is the display direction 205 of the display apparatus 100 worn by the user 202 facing frontward. FIGS. 9A, 9B, 10A, and 10B show examples of the relative position between the display apparatus 100 and the controller 220 and examples of images taken by the camera 220 at the relative position. FIG. 9A is a top view of the display apparatus 100 and the controller 220 when the relative position φ is 0. At this relative position, the controller 220 takes an image 601 as illustrated in FIG. 9B. FIG. 9B shows that the markers 501 and 502 are positioned to be line-symmetrical with respect to a vertical axis of symmetry in the image 601.

Figure 10A:
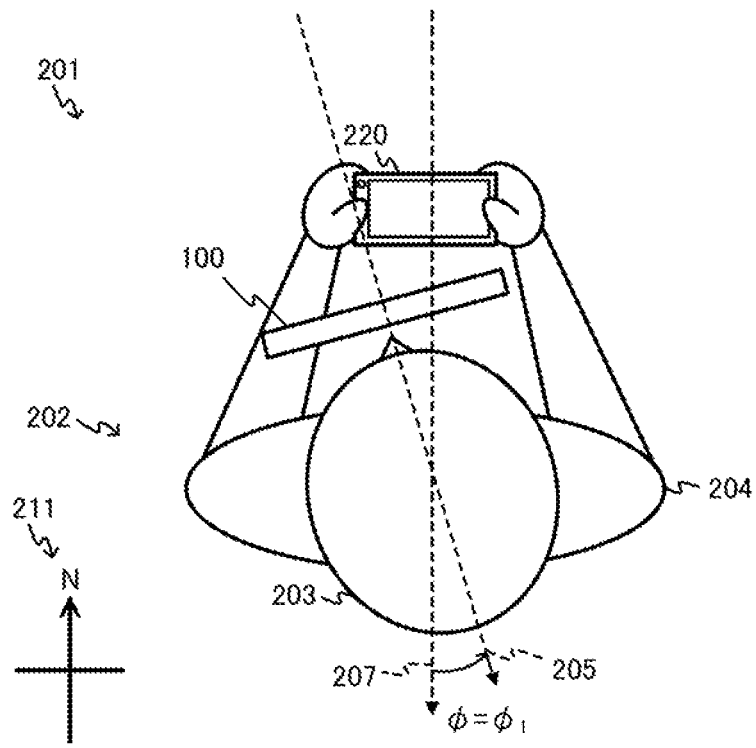
FIG. 10A is a top view of the display apparatus and the controller when the relative position is $\varphi_1$.
Figure 10B:
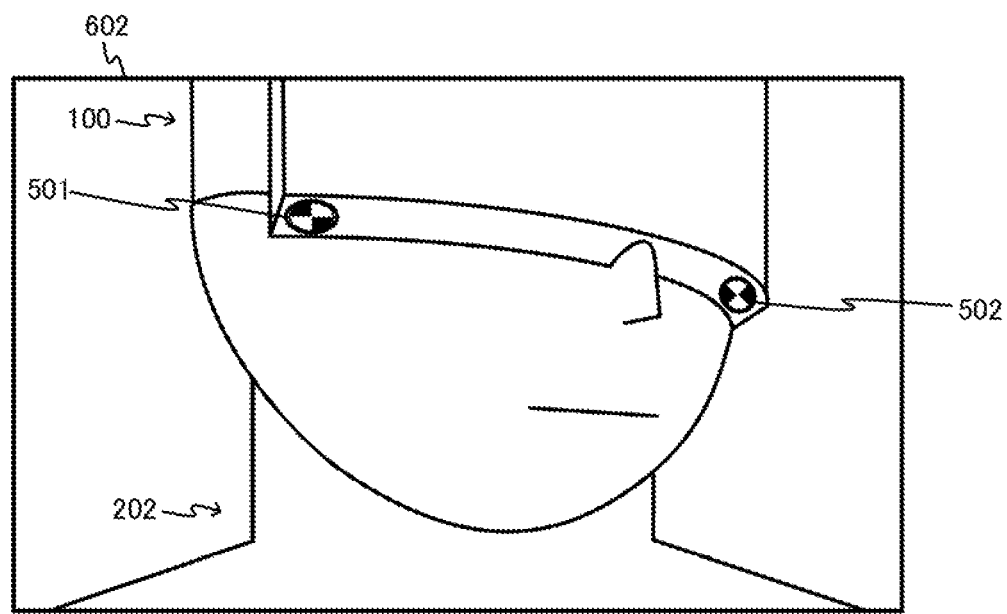
FIG. 10B is an image taken by the controller in the state illustrated in FIG. 10A.

FIG. 10A is a top view of the display apparatus 100 and the controller 220 when the relative position $\varphi = \varphi_1$ ($\varphi_1 > 0$). At this relative position, the controller 220 takes an image 602 as illustrated in FIG. 10B. FIG. 10B shows that the markers 501 and 502 are shifted to the right from the positions of the markers 501 and 502 in the image 601 in FIG. 9B.

The controller 220 is capable of identifying the relative position φ from positional relationships of the markers 501 and 502 in an image taken by the camera 222, by storing in advance a relative position φ and positional relationships of the markers 501 and 502 in an image taken by the camera 222 at the relative position φ as illustrated in FIGS. 9A and 9B and in FIGS. 10A and 10B. The controller 220 transmits the identified relative position φ to the display apparatus 100. Thus, the obtainer 115 in the display apparatus 100 can obtain the relative position φ from the controller 220 via the communicator 107.

In the present embodiment, the control unit 101 and the communicator 107 collaborate with each other to function as the obtainer 115.

The base direction updater 116 updates the base direction 304, on the basis of the observation direction 303 and of the relative position obtained by the obtainer 115.

By way of example, the following describes an update of the base direction in the case where the obtainer 115 has obtained, from the controller 220, a relative position φ, which is an angle formed between the reference direction 207 and the display direction 205. For example, when the obtainer 115 obtains from the controller 220 the relative position $\varphi = \varphi_1$ as of time tb, the base direction updater 116 determines the base direction 304b so as to form an angle $\varphi_1$ with the observation direction 303b as illustrated in FIG. 5B, because a relative position φ corresponds to an angle formed between the observation direction 303 and the base direction 304 in the virtual space 301. In other words, the base direction updater 116 updates the base direction 304a to the base direction 304b by rotating, by a relative position of $φ_1$, the observation direction 303b, which is stored in the state information storage 121, around the reference axis of the observation position 302a, which is stored in the state information storage 121.

In the present embodiment, the control unit 101 functions as the base direction updater 116.

On the basis of the observation position 302 and the observation direction 303 that are stored in the state information 121, the generator 117 generates an image of the virtual space 301 as observed from the observation position 302 in the observation direction 303. Specifically, the generator 117 generates an image of objects (not illustrated) placed in the virtual space, as seen from the observation position 302 in the observation direction 303, by using a technique such as perspective projection, on the basis of predetermined positions and shapes of the objects in the virtual space 301. For example, as illustrated in FIG. 3A, in the case where the user 202 changes the orientation of the display device 100 by changing the orientation of the head 203 only, the generator 117 generates, at time $t_a$, an image of the virtual space 301 observed from the observation position 302a in the observation direction 303a indicated in FIG. 5A, and generates, at time $t_b$, an image of the virtual space 301 observed from the observation position 302b in the observation direction 303b indicated in FIG. 5A. In the case where the user 202 changes the orientation of the torso 204 only as illustrated in FIG. 3B, the generator 117 generates, at time $t_a$, an image of the virtual space 301 observed from the observation position 302a in the observation direction 303a indicated in FIG. 5B, and generates, at time $t_b$, an image of the virtual space 301 observed from the observation position 302b in the observation direction 303b indicated in FIG. 5B.

In the present embodiment, the control unit 101 functions as the generator 117.

The display unit 118 shows an image generated by the generator 117 on the display 104.

In the present embodiment, the control unit 101 and the display 104 collaborate with each other to function as the display unit 118.

Figure 11:
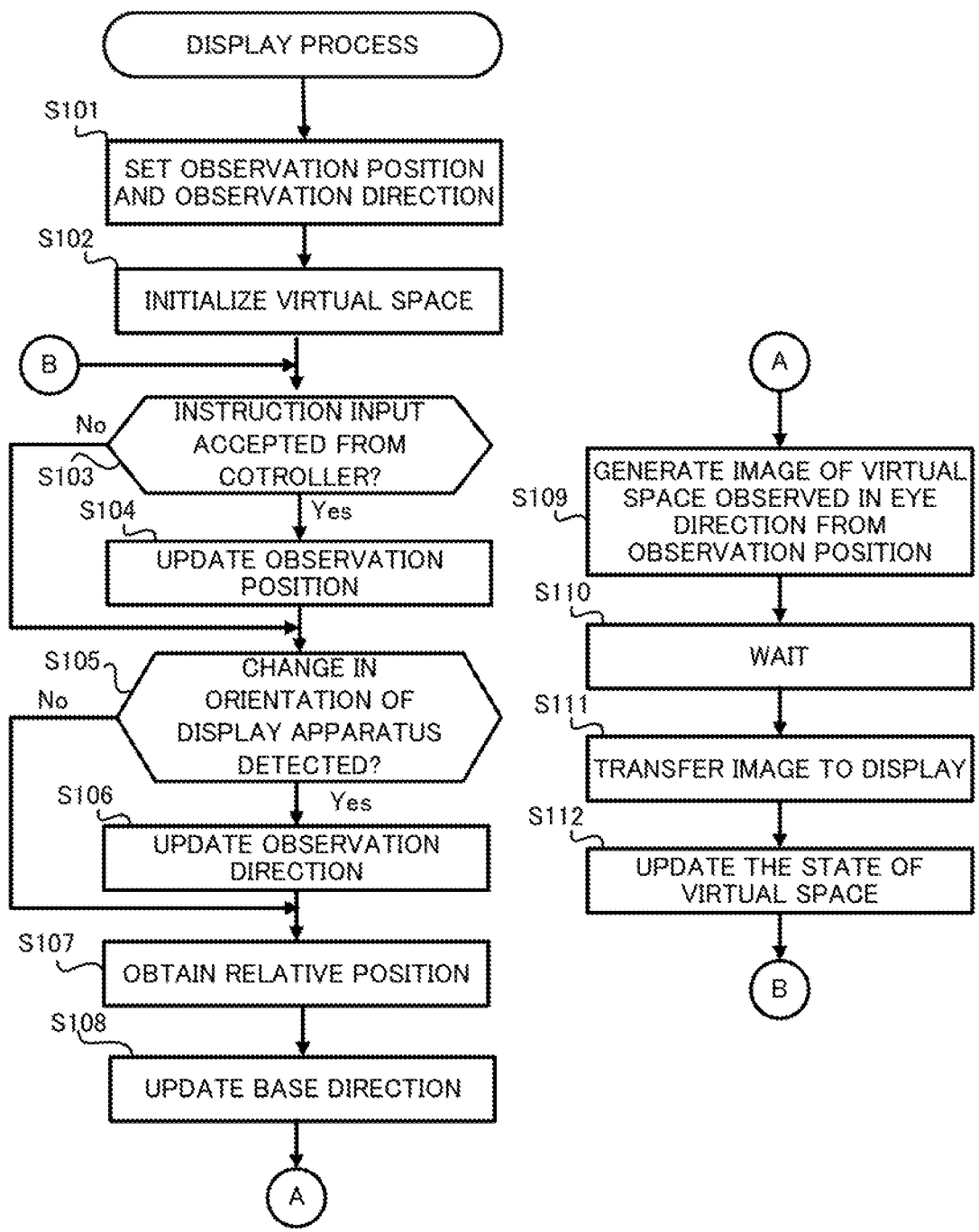
FIG. 11 is a flowchart illustrating a flow of a display process executed by a control unit included in the display apparatus according to an embodiment.

The following describes operations of the display apparatus 100 according to the embodiment of the present disclosure. FIG. 11 is a flowchart illustrating a flow of a display process executed by the control unit 101 in the display apparatus 100. Start of the process is triggered by, for example, acceptance of an instruction to start the process via the operator 106.

First, the display apparatus 100 initializes the observation position 302 and the observation direction 303 in the virtual space 301 to a predetermined position and direction, and stores the observation position 302 and the observation direction 303 into the state information storage 121 (step S101).

Next, the display apparatus 100 initializes the virtual space 301 (step S102). During the initialization, the display apparatus 100 makes settings, including, for example, obtaining and setting the position, shape, orientation, and appearance of an object to be placed in the virtual space 301, and obtaining and setting an image of the background supposed to be placed at an infinite distance in the virtual space 301.

The display apparatus 100 then determines whether an instruction input has been accepted from the controller 220 (step S103). If no instruction input has been accepted from the controller (No in step S103), the display apparatus 100 goes to step S105.

If an instruction input has been accepted from the controller (Yes in step S103), the display apparatus 100 updates the observation position 302, which is stored in the state information storage 121, to the observation position 302, to which the observation position will be moved by a certain distance in the moving direction indicated by the accepted instruction input (step S104).

Then, the display apparatus 100 determines whether a change in orientation of the display apparatus 100 has been detected (step S105). If no change in orientation of the display apparatus 100 has been detected (No in step S105), the display apparatus 100 goes to step S107.

If a change in orientation of the display apparatus 100 has been detected (Yes in step S105), the display apparatus 100 updates the observation direction 303, which is stored in the state information storage 121, in accordance with the amount of rotation θ representing the detected change in orientation of the display apparatus 100 (step S106).

Next, the display apparatus 100 obtains the relative position between the controller 220 and the display apparatus 100 (step S107). On the basis of the observation direction 303, which is stored in the state information storage 121, and of the obtained relative position, the display apparatus 100 updates the base direction 304, which is stored in the state information storage 121 (step S108).

Then, the display apparatus 100 generates an image of the virtual space 301 observed in the observation direction 303 from the observation position 302, as stored in the state information storage 121 (step S109).

After that, the display apparatus 100 waits until a vertical synchronization interrupt occurs on the display 104 (step S110), and then transfers the generated image to the display 104 to present the image to the user (step S111).

Then, the display apparatus 100 updates the state of the virtual space 301 (step S112). For example, in the case where the virtual space 301 is created by computer graphics that change with time, the display apparatus 100 conducts a physical simulation by which the position and orientation of an object are updated in accordance with the velocity, acceleration, angular velocity, angular acceleration, and the like that are set to the object, or deforms an object in accordance with predetermined conditions.

The display apparatus 100 then returns to the processing in step S103. The display apparatus 100 repeats the foregoing process until, for example, an instruction to exit the process is accepted via the operator 106. Since the display apparatus 100 waits in step S110, the cycle period for this process is a vertical synchronization period.

As described above, upon acceptance of an instruction input indicating the moving direction given via the controller 220, the display apparatus 100 according to the embodiment of the present disclosure updates the observation position of the avatar so that the observation position moves in the moving direction indicated by the instruction input relative to the base direction of the avatar 401. In addition, the display apparatus 100 obtains the relative position between the controller 220 and the display apparatus 100 by identifying the position of the display apparatus 100 appearing in an image taken by the camera 222 included in the controller 220. Then, the display apparatus 100 updates the base direction, on the basis of the observation direction of the avatar 401 as updated in accordance with the change in orientation of the display apparatus detected by the sensor 105 and of the obtained relative position. Thus, the observation position 302, which represents the orientation of the head 402 of the avatar 401 in the virtual space 301, and the base direction 304, which represents the orientation of the torso 403 of the avatar, are managed independently by the display apparatus 100. Therefore, even when the user intuitively inputs to the controller 220 an instruction input indicating the moving direction relative to the frontward direction 206 of the torso 204 of the user, the display apparatus 100 is capable of moving the observation position 302 in the virtual space in accordance with such intuitive instruction input given by the user.

In addition, the display apparatus 100 obtains from the controller 220 the relative position identified by the controller 220 on the basis of the position of the display apparatus 100 appearing in an image taken by the camera 222. Thus, the display apparatus 100 can obtain the relative position without using an external device such as a camera for taking an image that includes images of the controller 220 and the display apparatus 100. Therefore, the display apparatus 100 can be implemented in a lower-cost configuration.

Embodiments of the present disclosure have been described above, but these embodiments are examples only and the scope of the present disclosure is not limited thereto. In other words, the present disclosure allows for various applications and every possible embodiment is included in the scope of the present disclosure.

For example, in the example described in the foregoing embodiment, the display apparatus 100 includes two markers 501 and 502, but the number of markers included in the display apparatus 100 is not limited to two. The display apparatus 100 may include a single marker or may include at least three markers.

In the example described in the foregoing embodiment, the camera 222 included in the controller 220 recognizes the markers 501 and 502 included in the display apparatus 100, whereby the controller 220 identifies the relative position between the controller 220 and the display apparatus 100 and transmits the identified relative position to the display apparatus 100. However, the display apparatus 100 may use another method to obtain the relative position. For example, the display apparatus 100 may include, instead of the markers 501 and 502, a light emitter indicating the power status of the display apparatus 100, such as a light-emitting diode (LED). In this case, the display apparatus 100 may cause the light emitter to, for example, blink light in a predetermined pattern or change colors of the light so that the controller 220 can recognize the light emitter in an image taken by the camera 222, thereby identifying the relative position based on the position of the light emitter.

In the example described in the foregoing embodiment, the controller 220 identifies the relative position and transmits the identified relative position to the display apparatus 100, whereby the display apparatus 100 obtains the relative position. However, the display apparatus 100 may use another method to obtain the relative position. For example, in a case where the display apparatus 100 includes a camera and the controller 220 includes markers, the camera included in the display apparatus 100, instead of the camera 222 included in the controller 220, may take an image of the controller 220, and the display apparatus 100 may identify the relative position from the positions of the markers appearing in the taken image. In other words, a sensor included in one of the controller 220 and the display apparatus 100 detects the other one of the controller 220 and the display apparatus 100, the sensor being included in at least one of the controller 220 and the display apparatus 100, whereby the relative position between the controller 220 and the display apparatus 100 can be obtained.

Figure 12:
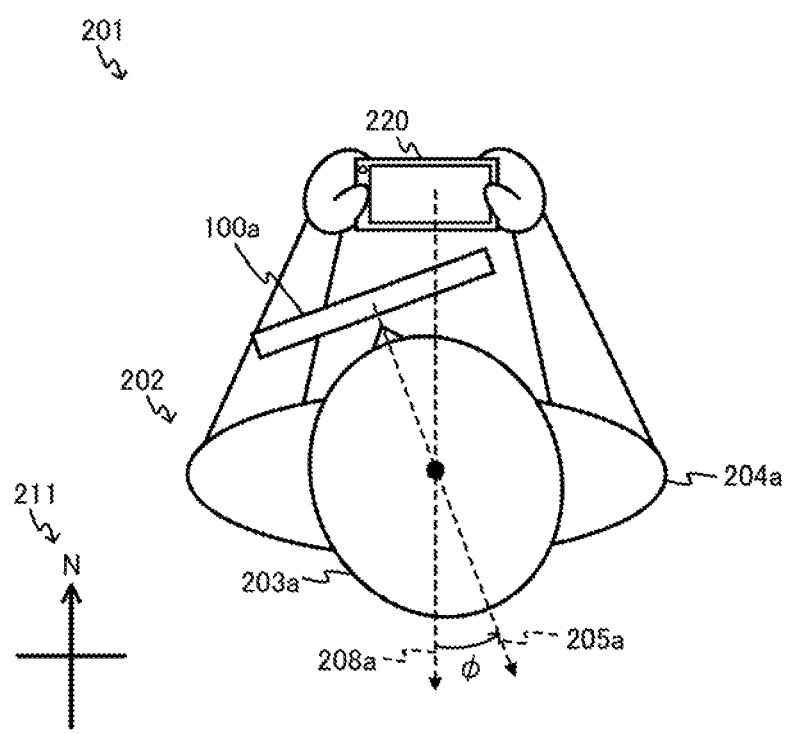
FIG. 12 is a top view of the display apparatus and the user in the real space before their orientations are changed according to a variation.

When the camera 222 in the controller 220 is unable to detect the display apparatus 100 in the foregoing embodiment, such as, for example, when the markers 501 and 502 are unrecognized based on an image taken by the camera 222 in the controller 220, the display apparatus 100 may obtain a relative position estimated from a difference between a first orientation detected by an attitude sensor included in the controller 220 and a second orientation detected by an attitude sensor included in the sensor 105 in the display apparatus 100. Suppose that, as illustrated in an example in FIG. 12, at time $t_a$, the attitude sensor in the controller 220 detected the first orientation, which is a display direction 208a of the controller 220, while the attitude sensor included in the sensor 105 in the display apparatus 100 detected a display direction 205a. Then, the controller 220 may transmit the detected display direction 208a to the display apparatus 100, and the display apparatus 100 can estimate the relative position $\varphi$ from a difference between the received display direction 208a and the detected display direction 205a. Alternatively, the display apparatus 100 may transmit the detected display direction 205a to the controller 220, and the controller 220 may estimate the relative position $\varphi$ from a difference between the detected display direction 208a and the received display direction 205a. In this case, the controller 220 transmits the estimated relative position $\varphi$ to the display apparatus 100, whereby the display apparatus 100 can obtain the relative position $\varphi$.

Functions according to the present disclosure can be provided in the form of the display apparatus 100 preconfigured to implement these functions, and furthermore, an existing apparatus such as a personal computer or an information terminal device can function as the display apparatus 100 according to the present disclosure when a program is applied to the apparatus. In other words, by applying a program for implementing the individual functional components of the display apparatus 100 illustrated in the foregoing embodiment to an existing personal computer or information terminal device in such a way that the program can be executed by the CPU or the like that controls the existing personal computer or information terminal device, the personal computer or the information terminal device can function as the display apparatus 100 according to the present disclosure. A display method according to the present disclosure can be implemented by using the display apparatus 100.

In addition to the aforementioned method, the program can be applied by any appropriate method. For example, the program stored in a computer-readable recording medium (a compact disc read-only memory (CD-ROM), a digital versatile disc (DVD), a magneto-optical disc (MO), and so on) can be applied, or the program stored in a storage on a network such as the Internet can be downloaded to be applied.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure achieves providing a display apparatus, a display method, a program, and a non-transitory computer-readable information recording medium for displaying images.

REFERENCE SIGNS LIST 100 (100a, 100b) Display apparatus
101 Control unit
102 ROM
103 RAM
104 Display
105 Sensor
106 Operator
107 Communicator
108 Bus
111 Accepter
112 Observation position updater
113 Detector
114 Observation direction updater
115 Obtainer
116 Base direction updater
117 Generator
118 Display unit
121 State information storage
201 Real space
202 User
203 (203a, 203b) User's head
204 (204a, 204b) User's torso
205 (205a, 205b) Display direction of display apparatus
206 (206a, 206b) Frontward direction
207 (207a, 207b) Reference direction
208a Display direction of controller
211 Azimuth directions in real space
220 Controller
221 Touch panel
222 Camera
301 Virtual space
302 (302a, 302b) Observation position
303 (303a, 303b) Observation direction
304 (304a, 304b) Base direction
311 Azimuth directions in virtual space
401 (401a, 401b) Avatar
402 (402a, 402b) Avatar's head
403 (403a, 403b) Avatar's torso
501, 502 Marker
601, 602 Image

The invention claimed is:

1. A display device comprising:
at least one memory configured to store computer program code;
at least one processor configured to access said computer program code and operate as instructed by the computer program code, said computer program code including:
accepting code configured to cause at least one of the at least one processor to accept an instruction input indicating a moving direction of an avatar, the instruction input being given to an external controller;
detecting code configured to cause at least one of the at least one processor to detect a change in orientation of the display device;
storing control code configured to cause at least one of the at least one processor to store an observation position based on a position of a head of the avatar, an observation direction based on a direction of an eye of the avatar, and a base direction based on a direction of a torso of the avatar in a virtual space;
observation position updating code configured to cause at least one of the at least one processor to update, upon acceptance of the instruction input, the observation position so that the observation position moves in the moving direction indicated by the instruction input relative to the base direction, even if the observation direction is different from the moving direction indicated by the instruction input relative to the base direction;
observation direction updating code configured to cause at least one of the at least one processor to update the observation direction in accordance with the detected change in orientation of the display device;
obtaining code configured to cause at least one of the at least one processor to obtain a relative position between the controller and the display device;
base direction updating code configured to cause at least one of the at least one processor to update the base direction, based on the observation direction and on the obtained relative position; and
light emitter code configured to cause at least one of the at least one processor to shine light in a predetermined pattern,
wherein the obtaining code is further configured to cause at least one of the at least one processor to obtain from the controller the relative position that is identified by the controller based on a position of the light emitter in an image taken by a camera included in the controller and on the pattern.

2. The display device according to claim 1,
wherein the obtaining code is configured to cause at least one of the at least one processor to obtain the relative position through detection performed by a sensor included in at least one of the controller or display device to detect another of the at least one of the controller or the display device.

3. The display device according to claim 1,
wherein the obtaining code is configured to cause at least one of the at least one processor to obtain the relative position estimated from a difference between a first orientation detected by a first attitude sensor included in the controller and a second orientation detected by a second attitude sensor included in the display device.

4. A display method executed by a display device that comprises a storage storing an observation position based on a position of a head of an avatar, an observation direction based on a direction of an eye of the avatar, and a base direction based on a direction of a torso of the avatar in a virtual space, the display method comprising:
accepting an instruction input indicating a moving direction of the avatar, the instruction input being given to an external controller;
detecting a change in orientation of the display device;
updating, upon acceptance of the instruction input, the observation position so that the observation position moves in the moving direction indicated by the instruction input relative to the base direction, even if the observation direction is different from the moving direction indicated by the instruction input relative to the base direction;
updating the observation direction in accordance with the detected change in orientation of the display device;
obtaining a relative position between the controller and the display device; and updating the base direction, based on the observation direction and on the obtained relative position; and shining light in a predetermined pattern and obtaining the relative position that is identified by the controller based on a position of the light emitted in an image taken by a camera included in the controller and on the pattern.

5. A non-temporary computer-readable information storage medium recording a program causing a computer that comprises a storage storing an observation position based on a position of a head of an avatar, an observation direction based on a direction of an eye of the avatar, and a base direction based on a direction of a torso of the avatar in a virtual space to:

accept an instruction input indicating a moving direction of the avatar, the instruction input being given to an external controller;

detect a change in orientation of a display device;

update, upon acceptance of the instruction input, the observation position so that the observation position moves in the moving direction indicated by the instruction input relative to the base direction, even if the observation direction is different from the moving direction indicated by the instruction input relative to the base direction;

update the observation direction in accordance with the detected change in orientation of the display device;

obtain a relative position between the controller and the display device; and update the base direction, based on the observation direction and on the obtained relative position; and shine light in a predetermined pattern and obtain the relative position that is identified by the controller based on a position of the light emitted in an image taken by a camera included in the controller and on the pattern.

* * * * *